No. 771,457.

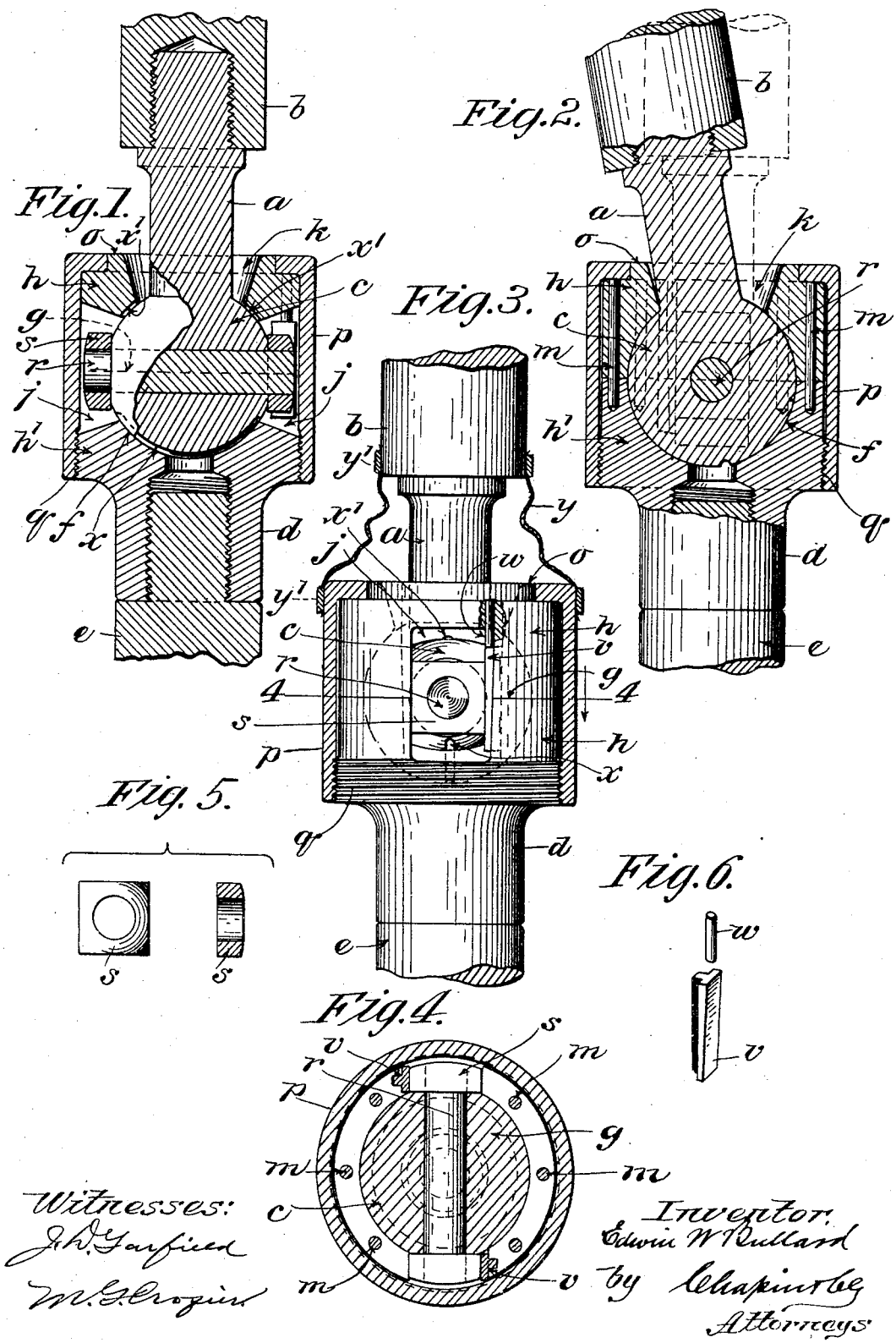

Patented October 4, 1904.

UNITED STATES PATENT OFFICE.

EDWIN W. BULLARD, OF SPRINGFIELD, MASSACHUSETTS.

UNIVERSAL JOINT.

SPECIFICATION forming part of Letters Patent No. 771,457, dated October 4, 1904.

Application filed May 18, 1904. Serial No. 208,589. (No model.)

*To all whom it may concern:*

Be it known that I, EDWIN W. BULLARD, a citizen of the United States of America, residing at Springfield, in the county of Hampden and State of Massachusetts, have invented new and useful Improvements in Universal Joints, of which the following is a specification.

This invention relates to universal joints, the object of the invention being to provide an improved joint of this description, of the ball-and-socket type, whereby means are provided to take up the wear between the moving parts of the device to do away with any lost motion; and the invention consists in the construction set forth in the following specification and clearly pointed out in the claims appended thereto, the novel construction on which the claims are based being clearly illustrated in the accompanying drawings, in which—

Figure 1 is an elevation, partly in section, of a joint embodying the invention. Fig. 2 is a similar view to Fig. 1, the plane of the section being at right angles to that of the last-named figure. Fig. 3 is an elevation of certain of the parts in their assembled position. Fig. 4 is a transverse section on line 4 4, Fig. 3. Fig. 5 includes an elevation and section of one of the bearing-blocks. Fig. 6 is a perspective view of certain parts of the device to take up wear.

Referring to the drawings, $a$ is one of the shaft-sections, one end of which is threaded, whereby it may be secured in operative engagement with a driving or driven shaft, the latter being indicated by $b$. On the opposite end of this shaft-section $a$ a ball $c$ is formed. The other shaft-section is indicated by $d$, and one end of this is bored out and threaded to permit it to be secured in operative engagement with a driven or driving shaft, as $e$. The shaft-section $d$ is of such diameter as will permit the formation therein of a spherical socket $f$ to receive the ball $c$. This shaft-section $d$ is made in two parts, the line of division running at right angles to the axis of the shaft-section $a$. This line is lettered $g$, and the portion of the shaft-section lying above it is lettered $h$ and the portion below it $h'$, one half of the spherical socket $f$ being formed in the portion $h$ and the other half in the portion $h'$. Two vertical slots $j$ are cut through the wall of the section $d$, extending into the spherical socket $f$. These slots are oppositely located and parallel and extend to an equal degree above and below the line $g$. The shaft-section $d$ is circular in cross-section, as shown in Fig. 4, and the portion $h$ thereof has a central aperture $k$ extending into the socket $f$, said aperture being of a size to permit the shaft-section $a$ above the ball $c$ to pass through it to permit the assemblage of the two portions of the shaft-section $d$. These two portions are doweled together, as shown, the dowels $m$ extending from the upper end of the portion $h$ down through it into holes in the portion $h'$ without cutting into the socket $f$. Exteriorly the upper end of the portion $h$ is turned off to provide an upstanding flange $o$ around the aperture $k$, and the portions $h$ and $h'$ of the shaft-section $d$ are secured together by a cylindrical shell $p$, which is fitted over and incloses both of these portions, as shown in the main figures of the drawings, said shell being internally threaded at its lower end, whereby it may be screwed onto the threaded part $q$ of the portion $h'$ of the shaft-section $d$, the diameter of which is such where said thread is cut that the side walls of the shell will be out of contact with the side of the shaft-section. The upper end of the shell is centered by the flange $o$, a hole being cut through the end of said shell to fit said flange closely. When the shell, therefore, is screwed onto the lower portion $h'$ of the shaft-section $d$, it will bind the two portions $h$ and $h'$ together and hold the dowel-pins in their places, Thus while the dowel-pins constitute the active element to hold the two portions $h$ and $h'$ together the shell $p$, notwithstanding the fact that it is not in contact with the side of the shaft-section $a$, adds greatly to the strength and rigidity of the structure, for it is screwed solidly on the portion $h'$, as described, and the opposite end fits closely over the flange $o$, and besides it serves to exclude dirt from the slots $j$, which extend into the socket $f$.

On the opposite sides of the ball $r$ on the transverse axis thereof two trunnions $v$ are formed. These may be integral with the ball, if desired, or, as shown in the drawings, a pin may be driven entirely through the ball, its protruding ends constituting the trunnions. On these trunnions are fitted the bearing-blocks s, (shown in detail in Fig. 3,) which in turn have a close sliding fit in the vertical slots j. Thus when the shaft-section a is swung in a plane parallel with the axis of the trunnions the bearing-blocks will have a sliding movement in said slots j, and when swung in a plane at right angles to the axis of said trunnions said shaft-section will swing on the trunnions, the blocks remaining stationary. In all planes of movement between these two the movement will be a compound movement of the two above described, as usual in joints of this character. The bearing of the ball in its socket, however, serves to maintain the point of intersection of the axes of the joint in an unvarying position, thus insuring an entirely smooth action between the parts in whatever position they may assume.

Means are provided for taking up the wear of the bearing-blocks s in the slots j by inserting in one of the vertical sides of each slot a sliding wedge v. (Shown in detail in Fig. 6.) Preferably this wedge is made T shape in cross-section, the rib on the back side of the wedge fitting closely a slot milled in the border of the slot j, and a hole is drilled from the upper end of the portion h into the slot j to receive a pin w, the hole being so located that the end of said pin will bear on the upper end of the wedge v, the length of the pin being such that when the shell p is screwed down against the upper end of said portion h it will move the wedge v to such a position as to provide a proper bearing for the block s. If desired, this pin may be replaced by a screw, the head of which would be countersunk in the upper end of the portion h, whereby the wedge may be adjusted independently of the shell p.

To provide for the proper lubrication of the ball and socket, a groove x is formed in the lower surface of the ball c, and another groove x' may, if desired, be located in the upper part of the socket f in the portion h of the shaft-section d. Should any wear take place between the ball and socket, the shell p may be removed and the portions h and h' of the shaft-section d separated, and the edges of one or both of the latter which come together on the divisional line g may be ground off. When the portions h and h' are ground off, the pin w will also be proportionally shortened if no adjustment of the wedge v is to be effected. If the latter alone is to be adjusted, a longer pin v may be substituted for the one in use.

To exclude dust from the joint, a piece of flexible material y may be bound to the upper edge of the shell and to the lower end of the shaft b by means of clamping-rings y' or in any other suitable manner. This positively excludes dust from the working parts of the joint, as it is only through the aperture k that dust can have access thereto.

Having thus described my invention, what I claim, and desire to secure by Letters Patent of the United States, is—

1. A universal joint consisting of one shaft-section provided with a ball at the extremity thereof; a second shaft-section having a spherical socket formed in one extremity thereof to receive said ball, said socket being divided into two portions on its transverse axis, and having vertical oppositely-disposed, parallel slots located in part in both portions of the socket; dowel-pins in one of said socket portions extending into the other portion, a shell to inclose said socket portions to rigidly secure them together; and trunnions on the ball extending into said vertical slots.

2. A universal joint consisting of two shaft-sections provided respectively one with a ball and the other with a spherical socket to receive the ball, said socket being divided into two portions transversely in the plane of the center of the ball; interlocking means to maintain said portions in fixed relation one to the other, an inclosing shell for said socket portions, and means to secure the shell to one of said portions, to hold the two portions together, there being vertical oppositely-located slots in said socket portions; together with trunnions on said ball extending into said vertical slots.

3. A universal joint consisting of two shaft-sections provided respectively one with a ball and the other with a socket to receive the ball; said socket being divided into two portions in the plane of the center of the ball and at right angles to the axis of the ball-provided shaft-section; there being oppositely-located slots in said socket portions at right angles to the line of division between said portions; trunnions on the ball, and bearing-blocks on the trunnions to fit said slots, and means of adjustment between said blocks and the border of said slots to take up wear; a shell to inclose both of said socket portions, and provided with a screw engagement with one of them, whereby they may be secured together in registering position.

4. A universal joint of the ball-and-socket type comprising a ball-provided shaft-section, a socket divided into two portions in the plane of the center thereof and at right angles to the axis of said shaft-section, whereby wear between the ball and the socket may be taken up in one plane; there being oppositely-disposed slots in the socket portions located at right angles to the divisional line between said portions; trunnions on said ball to enter said slots, bearing-blocks on the trunnions slidable in said slots, and means to take up the wear between one side of said blocks and the border of said slots in a plane at right angles to said first-named plane; together with a shell having a screw engagement with one of the socket portions to bind the other of said portions thereto.

5. A universal joint consisting of one shaft-section provided with a ball at the extremity thereof; a second shaft-section having a spherical socket formed in one extremity thereof to receive said ball, said socket being divided into two portions on its transverse axis, and having vertical oppositely-disposed, parallel slots located in part in both portions of the socket; interlocking means on said socket portions to hold them in registering positions, a shell to inclose said socket portions to rigidly secure them together, and trunnions on the ball extending into said vertical slots.

EDWIN W. BULLARD.

Witnesses:
 Wm. H. Chapin,
 K. I. Clemons.